US012743391B2

(12) United States Patent
Wang et al.

(10) Patent No.: US 12,743,391 B2
(45) Date of Patent: Sep. 22, 2026

(54) PROGRAMMABLE LOGIC DEVICE SYSTEM OF BASEBOARD, AND APPLICATION DEVICE THEREOF

(71) Applicant: SUZHOU METABRAIN INTELLIGENT TECHNOLOGY CO., LTD., Suzhou (CN)

(72) Inventors: Jinyou Wang, Suzhou (CN); Wei Han, Suzhou (CN); Guangying Xue, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/470,727

(22) PCT Filed: Sep. 27, 2024

(86) PCT No.: PCT/CN2024/122026

§ 371 (c)(1), (2) Date: Sep. 29, 2025

(87) PCT Pub. No.: WO2025/152502

PCT Pub. Date: Jul. 24, 2025

(65) Prior Publication Data

US 2026/0119434 A1 Apr. 30, 2026

(30) Foreign Application Priority Data

Jan. 17, 2024 (CN) ........................ 202410064086.8

(51) Int. Cl.
*G06F 13/40* (2006.01)
*G06F 13/42* (2006.01)

(52) U.S. Cl.
CPC ...... *G06F 13/4022* (2013.01); *G06F 13/4221* (2013.01)

(58) Field of Classification Search
CPC ......................... G06F 13/4022; G06F 13/4221
See application file for complete search history.

(56) References Cited

U.S. PATENT DOCUMENTS 8,417,774 B2 * 4/2013 Flynn .................... G06F 3/0688 714/E11.154
10,120,702 B2 * 11/2018 Thomas ................ G06F 9/4411
(Continued)

FOREIGN PATENT DOCUMENTS

CN 105721357 A 6/2016
CN 107908582 A 4/2018
(Continued)

*Primary Examiner* — Henry Tsai
*Assistant Examiner* — Christopher A Daley
(74) *Attorney, Agent, or Firm* — IPro, PLLC

(57) ABSTRACT

The present application provides a programmable logic device system of a baseboard. The programmable logic device system of the baseboard includes: a low pin count bus parsing module configured to parse a low pin count bus command issued by a central processing unit (CPU); a register space allocation module configured to allocate data of the low pin count bus command to a preset register address space; a serial port hub module configured to interact with the CPU and a baseboard management controller (BMC), and provide the preset register address space; a serial port parsing module configured to parse serial port data between a baseboard serial port module and the CPU or between the baseboard serial port module and the BMC; a serial port switching module configured to connect the baseboard serial port module to the CPU or the BMC on the basis of serial port complete byte switching policy.

20 Claims, 5 Drawing Sheets

(56) References Cited

U.S. PATENT DOCUMENTS

| | | | | |
|---|---|---|---|---|
| 2007/0116067 | A1* | 5/2007 | Li | G06F 13/4027 370/535 |
| 2010/0205600 | A1* | 8/2010 | Tu | G06F 9/455 718/1 |
| 2014/0289570 | A1* | 9/2014 | Lewis | G06F 11/3089 714/43 |

FOREIGN PATENT DOCUMENTS

| | | | |
|---|---|---|---|
| CN | 109313623 | A | 2/2019 |
| CN | 111813725 | A | 10/2020 |
| CN | 113377701 | A | 9/2021 |
| CN | 113760800 | A | 12/2021 |
| CN | 114579400 | A | 6/2022 |
| CN | 117251401 | A | 12/2023 |
| CN | 117591449 | A | 2/2024 |

* cited by examiner

PROGRAMMABLE LOGIC DEVICE SYSTEM OF BASEBOARD, AND APPLICATION DEVICE THEREOF

CROSS-REFERENCE TO RELATED APPLICATION

The present application claims priority to Chinese patent application No. 202410064086.8, entitled "PROGRAMMABLE LOGIC DEVICE SYSTEM OF BASEBOARD, AND APPLICATION DEVICE THEREOF", filed on Jan. 17, 2024 before the China National Intellectual Property Administration, which is incorporated herein in its entirety by reference.

TECHNICAL FIELD

This application relates to the field of computer network communication technology, in particular to a programmable logic device system of a baseboard, a baseboard serial port system, a switch, an electronic device, and a storage medium.

BACKGROUND

With the rapid development of data center business, the quantity of switches required by data centers is also increasing rapidly, along with the increase in switch capacity, the number of panel ports, and port rates. Typically, users need to quickly access information from the management plane and the network forwarding plane through serial ports or management network ports. Since the management plane and the network forwarding plane belong to different management modules, the management network ports can access each management module through its respective IP (Internet Protocol) address, and the two sets of management modules communicate with each other through an internal link port. The panel serial ports need to switch to the serial ports of each management module for time-division access, and the two sets of management modules record each other's system logs through the serial ports. During the time-division switching process, incomplete transmission can easily occur, leading to garbled characters on the CPU (Central Processing Unit) side, BMC (Baseboard Management Controller) side, and the host computer side, and even causing the system serial port to abnormally hang.

SUMMARY

In view of the above-mentioned problems, embodiments of the present application provide a programmable logic device system of a baseboard, a baseboard serial port system, a switch, an electronic device, and a storage medium.

To address the above-mentioned problems, in a first aspect of the application, an embodiment of the application provides a programmable logic device system of a baseboard. One end of the programmable logic device system of the baseboard is connected to a central processing unit and a baseboard management controller, and the other end of the programmable logic device system of the baseboard is connected to a baseboard serial port module. The programmable logic device system of the baseboard includes:

- a low pin count bus parsing module, connected to the central processing unit and configured to parse low pin count bus commands issued by the central processing unit;
- a register space allocation module, connected to the low pin count bus parsing module and configured to allocate data from the low pin count bus commands to a preset register address space;
- a serial port hub module, connected to the central processing unit and the baseboard management controller, and configured to interact with the central processing unit and the baseboard management controller, and provide the preset register address space;
- a serial port parsing module, connected to the serial port hub module, and configured to parse serial port data between the baseboard serial port module and the central processing unit, or serial port data between the baseboard serial port module and the baseboard management controller; and
- a serial port switching module, connected to the serial port parsing module, and configured to connect the baseboard serial port module with the central processing unit or the baseboard management controller by performing serial port complete byte switching based on a serial port complete byte switching strategy.

In some embodiments, the programmable logic device system of the baseboard further includes:

- a filtering module located between the serial port parsing module and the baseboard serial port module and configured to filter out interference signals from the baseboard serial port module.

In some embodiments, the programmable logic device system of the baseboard further includes:

- a baud rate detection module connected to the baseboard serial port module and configured to detect baud rate of the baseboard serial port module, the baud rate being used for controlling data transmission rate.

In some embodiments, the serial port hub module includes:

- an interface idle detection submodule configured to detect switching instruction of the baseboard serial port module; and
- a switching determination submodule configured to, in response to the switching instruction being a first input instruction, generate a first target characteristic code or a second target characteristic code based on first switching data of the first input instruction.

In some embodiments, the serial port hub module further includes:

- an input sub-detection submodule configured to, in response to the switching instruction being a second switching instruction, parse the second switching instruction and determine second switching data;
- wherein the switching determination submodule is further configured to generate the first target characteristic code or the second target characteristic code based on the second switching data.

In some embodiments, the serial port switching module includes:

- a serial port status judgment submodule, configured to: obtain status characteristic code of the serial port parsing module; connect the baseboard serial port module with the central processing unit or the baseboard management controller based on the status characteristic code.

In some embodiments, the serial port status judgment submodule is configured to: obtain the status characteristic code of the serial port parsing module; in response to the status characteristic code being the first target characteristic code, connect the baseboard serial port module with the baseboard management controller; in response to the status characteristic code being the second target characteristic code, connect the baseboard serial port module with the central processing unit.

In some embodiments, the serial port switching module further includes:

- a first central processing unit transmission status detection submodule configured to: detect whether a transmission direction from the central processing unit to the baseboard serial port module is idle in response to the status characteristic code being the first target characteristic code; disconnect a connection channel from the central processing unit to the baseboard serial port module in response to an idle state; and
- a first baseboard management controller transmission status detection submodule configured to: detect whether the transmission direction from the baseboard management controller to the baseboard serial port module is idle; in response to being in an idle state for a preset first waiting time, establish a channel connection between the baseboard serial port module and the baseboard management controller; return to the serial port status judgment submodule after the channel connection is established.

In some embodiments, the serial port switching module further includes:

- a second central processing unit transmission status detection submodule configured to: detect a transmission direction from the baseboard management controller to the baseboard serial port module in response to the status characteristic code being the second target characteristic code; in response to being in an idle state, disconnect a connection channel from the baseboard management controller to the baseboard serial port module;
- a second baseboard management controller transmission status detection submodule configured to: detect whether the transmission direction from the central processing unit to the baseboard serial port module is idle; in response to being in an idle state for a preset second waiting time, establish a channel connection between the baseboard serial port module and the central processing unit; return to the serial port status judgment submodule after the channel connection is established.

In some embodiments, the serial port parsing module includes:

- a start bit check submodule configured to detect whether a serial port start bit is present;
- an initiation submodule configured to receive start bit data of the serial port data in response to presence of the serial port start bit;
- a payload submodule configured to receive serial port byte data of the serial port data after the start bit data is received; and
- a stop submodule configured to receive stop bit data of the serial port data in response to determining that the received serial port byte data reaches a preset number of bits.

In some embodiments, the filtering module is configured to determine initial input value of the serial port input data as input value of the serial port input data in response to determining that a preset number of consecutive bits in the serial port input data of the baseboard serial port module are the same initial input value.

In some embodiments, the baud rate detection module is configured to count a change number of level on signal lines within a third preset time duration, and determine the baud rate based on the number counted.

In a second aspect of the application, the embodiments of this application provide a baseboard serial port system, including: a central processing unit, a baseboard management controller, a baseboard serial port module, and the programmable logic device system of the baseboard as described above, wherein one end of the programmable logic device system of the baseboard is connected to the central processing unit and the baseboard management controller, and the other end of the programmable logic device system of the baseboard is connected to the baseboard serial port module.

In some embodiments, the baseboard serial port module includes a panel physical interface connected to the other end of the programmable logic device system of the baseboard.

In some embodiments, the baseboard serial port system further includes:

- a level conversion submodule located between the level conversion submodule and the other end of the programmable logic device system of the baseboard, wherein the level conversion submodule is configured to convert level of the serial port.

In some embodiments, the central processing unit includes:

- a first universal asynchronous receiver-transmitter of the central processing unit that is connected to one end of the programmable logic device system of the baseboard, and configured to communicate with the baseboard serial port module based on the baseboard serial port system; and
- a second universal asynchronous receiver-transmitter of the central processing unit that is connected to one end of the programmable logic device system of the baseboard, and configured to generate start logs and operation logs of the central processing unit.

In some embodiments, the baseboard management controller includes:

- a first universal asynchronous receiver-transmitter of the baseboard management controller that is connected to one end of the programmable logic device system of the baseboard, and configured to communicate with the baseboard serial port module based on the baseboard serial port system; and
- a second universal asynchronous receiver-transmitter of the baseboard management controller that is connected to one end of the programmable logic device system of a baseboard, and configured to generate start logs and operation logs of the baseboard management controller.

In a third aspect of the application, the embodiments of this application provide a switch, including the baseboard serial port system as described above.

In a fourth aspect of the application, the embodiments of this application further provide an electronic device, including a processor, a memory, and a computer program stored on the memory and capable of running on the processor. When the computer program is executed by the processor, it implements the programmable logic device system of a baseboard as described above.

In a fifth aspect of the application, the embodiments of this application further provide a non-volatile computer-readable storage medium. The non-volatile computer-readable storage medium is stored with a computer program that, when the computer program is executed by a processor, implements the programmable logic device system of the baseboard as described above.

DETAILED DESCRIPTION OF THE EMBODIMENTS

To make the above-mentioned objects, features, and advantages of the application more apparent and understandable, the application is further described in detail below with reference to the accompanying drawings and specific embodiments.

Figure 1:
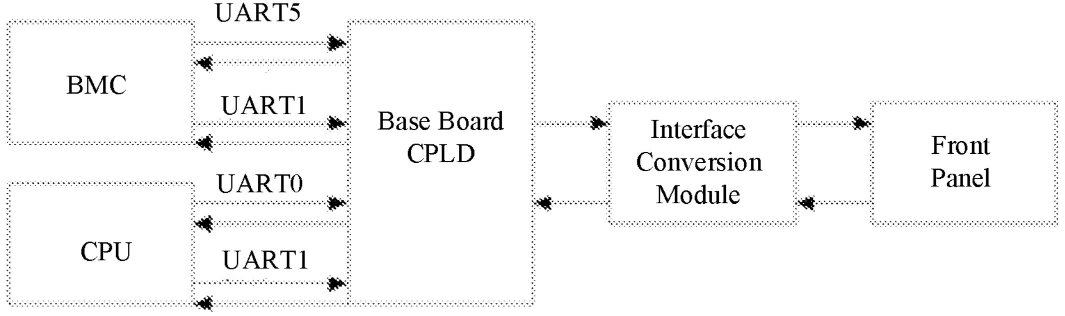
FIG. 1 is a schematic diagram of a serial port system provided in the related art.

Referring to FIG. 1, the existing serial port system solution consists of a baseboard management controller module (BMC module), a central processing unit (CPU), a baseboard of complex programmable logic devices (Base Board CPLD), an interface conversion module (MAX232), and a front panel (RJ45). The BMC module has asynchronous serial communication interface 5 (Universal Asynchronous Receiver/Transmitter, UART5) that is mainly used for communicating with panel serial ports, and asynchronous serial communication interface 1 (UART1) that is mainly used for recording boot logs and system operation logs of CPU. The CPU card has asynchronous serial communication interface 0 (UART0) that is mainly used for communicating with panel serial ports, and UART0 that is mainly used for recording boot logs and system operation logs of BMC. The Base Board CPLD is mainly used for serial port switching among panel serial ports, UART1 and UART5 of the BMC module, and UART5 and UART1 of the CPU card. The MAX232 is used for converting levels of the serial ports, and the panel RJ45 is a physical interface of the panel serial port.

The two sets of management modules communicate with each other through an internal link port. The panel serial port needs to switch to the serial ports of each management module for time-division access. Moreover, the management modules record each other's system logs through the serial ports. During the process of time-division switching, incomplete transmission can easily occur, leading to garbled characters on the CPU side, BMC side, and the host computer side, and even causing the system serial port to abnormally hang.

Figure 2:
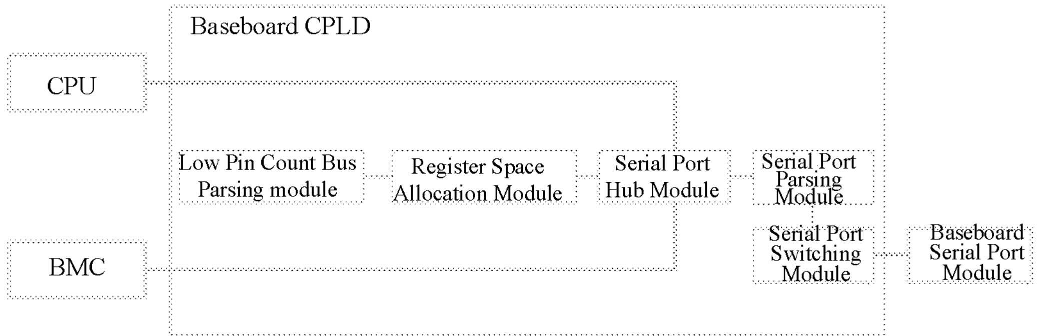
FIG. 2 is a schematic diagram of a programmable logic device system of a baseboard provided by some embodiments of this application.

FIG. 2 is a schematic diagram of a programmable logic device system of a baseboard provided by some embodiments of the application. One end of the programmable logic device system of the baseboard is connected to a central processing unit and a baseboard management controller, and the other end of the programmable logic device system of the baseboard is connected to a baseboard serial port module. The programmable logic device system of the baseboard includes:

a low pin count bus parsing module that is connected to the central processing unit, and configured to parse low pin count bus (LPC) commands issued by the central processing unit;

a register space allocation module that is connected to the low pin count bus parsing module, and configured to allocate data of the LPC commands to a preset register address space;

a serial port hub module that is connected to the central processing unit and the baseboard management controller, and configured to interact with the central processing unit and the baseboard management controller and provide the preset register address space;

a serial port parsing module that is connected to the serial port hub module, and configured to parse serial port data between the baseboard serial port module and the central processing unit, or serial port data between the baseboard serial port module and the baseboard management controller; and a serial port switching module that is connected to the serial port parsing module, and configured to connect the baseboard serial port module with the central processing unit or the baseboard management controller based on a serial port complete byte switching strategy.

In some embodiments of the application, the programmable logic device system of the baseboard (Base Board CPLD) includes at least a low pin count bus parsing module, a register space allocation module, a serial port hub module, a serial port parsing module, and a serial port switching module. The low pin count bus parsing module is connected to the central processing unit, and can parse LPC read/write commands issued by the CPU, feed back read data to the CPU, and configure write data to registers of the Base Board CPLD. The register address space allocation module is connected to the central processing unit, and can allocate data of the LPC commands to a preset register address space. For example, the serial port hub module occupies a 256-byte register address space, and the register space allocation module can allocate this 256-byte space. The serial port hub module can occupy the space from 0xA0 to 0xAF (160 to 175 bytes). The serial port hub module is connected to the central processing unit and the baseboard management controller and can interact with them. The serial port parsing module is connected to the serial port hub module, and can parse the serial port data between the baseboard serial port module and the baseboard management controller. The serial port switching module is mainly responsible for the serial port complete byte switching strategy, and connected to the serial port parsing module. The serial port switching module can connect, based on a serial port complete byte switching strategy, the baseboard serial port module with the central processing unit, or the baseboard management controller.

In some embodiments of the application, the low pin count bus parsing module is connected to the central processing unit to parse low pin count bus commands issued by the central processing unit; the register space allocation module is connected to the low pin count bus parsing module to allocate data of the low pin count bus commands to a preset register address space; the serial port hub module is connected to the central processing unit and the baseboard management controller for interacting with the central processing unit and the baseboard management controller and providing the preset register address space; the serial port parsing module is connected to the serial port hub module to parse serial port data between the baseboard serial port module and the central processing unit, or between the baseboard serial port module and the baseboard management controller; the serial port switching module is connected to the serial port parsing module to connect the baseboard serial port module with the central processing unit or the baseboard management controller based on a serial port complete byte switching strategy. Three sets of serial ports are all connected to the CPLD, which realizes the serial port complete byte switching according to the panel port switching instruction, avoiding abnormal serial port hanging. This can solve the problem of incomplete bytes caused by serial port switching between different management planes, which leads to garbled characters and system hanging. The central processing unit's serial ports, the baseboard management controller's serial ports, and the panel serial port use a unified serial port switching logic, which is highly portable in logic code, simplifies hardware design complexity, and makes logic modifications imperceptible to upper-layer software. This reduces development complexity and design difficulty, lowers development risks, and improves reliability, thereby saving costs.

In some embodiments of the application, the programmable logic device system of the baseboard further includes a filtering module that is located between the serial port parsing module and the baseboard serial port module, and configured to filter out interference signals from the baseboard serial port module.

The filtering module is located between the serial port parsing module and the baseboard serial port module, and can filter out interference signals, such as those caused by incorrectly inserting an Ethernet cable into the baseboard serial port module, to avoid garbled characters introduced by the incorrect insertion.

Specifically, the filtering module is configured to determine initial input value of serial port input data as the input value of the serial port input data when a preset number of consecutive bits in the serial port input data of the baseboard serial port module are the same initial input value.

Figure 3:
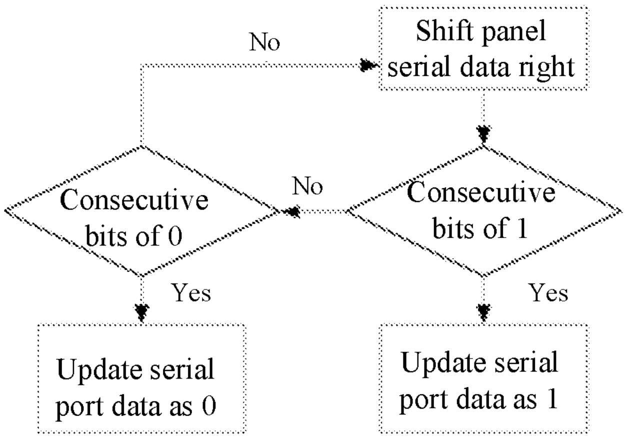
FIG. 3 is a schematic diagram illustrating processing of a filter module in the programmable logic device system of the baseboard provided by some embodiments of this application.

Referring to FIG. 3, during the process of receiving data, the serial port input data of the baseboard serial port module is continuously shifted right. In the course of shifting, a check is performed to determine whether a preset number of consecutive bits in the data are the same initial input value—for example, whether 50 consecutive bits are all 1 or 0. When a preset number of consecutive bits in the serial port input data of the baseboard serial port module are the same initial input value, the initial input value is determined as the input value of the serial port input data, thereby achieving the function of filtering out interference signals caused by incorrectly inserting an Ethernet cable into the panel serial port or interference signals from the panel serial port. For example, if 50 consecutive bits are 1, then 1 is determined as the input value of the serial port input data; or if 50 consecutive bits are 0, then 0 is determined as the input value of the serial port input data.

In some embodiments of the application, the programmable logic device system of the baseboard further includes: a baud rate detection module connected to the baseboard serial port module for detecting the baud rate of the baseboard serial port module, and the baud rate is used for controlling the data transmission rate.

The baud rate detection module can be connected to the baseboard serial port module, and configured to detect the baud rate of the baseboard serial port module, so that the data transmission rate is controlled according to the baud rate. In some embodiments of the application, the programmable logic device system of the baseboard can support baud rates of 9600 and 115200.

Specifically, the baud rate detection module is configured to count a change number of level on the signal line within a third preset time duration, and determine the baud rate based on the number counted.

The change number of level on the signal line is counted within the third preset time duration, and the baud rate is determined based on the number counted. For example, the change number of between the high level and the low level on the signal line within 1 second is counted, and the current baud rate of the panel serial port is determined based on the number counted.

In some embodiments of the application, the serial port hub module includes:

- an interface idle detection submodule configured to detect a switching instruction of the baseboard serial port module; and
- a switching determination submodule configured to, in response to the switching instruction being a first input instruction, generate a first target characteristic code or a second target characteristic code based on first switching data of the first input instruction.

In some embodiments of the application, the serial port hub module may include an interface idle detection submodule and a switching determination submodule. The interface idle detection submodule can detect the switching instructions of the baseboard serial port module and distribute them according to different switching instructions. When the switching instruction is a first input instruction, the switching determination submodule can generate a first target characteristic code or a second target characteristic code based on the first switching data.

In some embodiments of the application, the serial port hub module further includes:

- an input sub-detection submodule configured to, in response to the switching instruction being a second switching instruction, parse the second switching instruction and determine second switching data.

The switching determination submodule is further configured to generate the first target characteristic code or the second target characteristic code based on the second switching data.

In addition, the serial port hub module further includes an input sub-detection submodule. When the switching instruction is the second switching instruction, the input sub-detection submodule parses the second switching instruction and determines the second switching data. The switching determination submodule generates the first target characteristic code or the second target characteristic code based on the second switching data.

Figure 4:
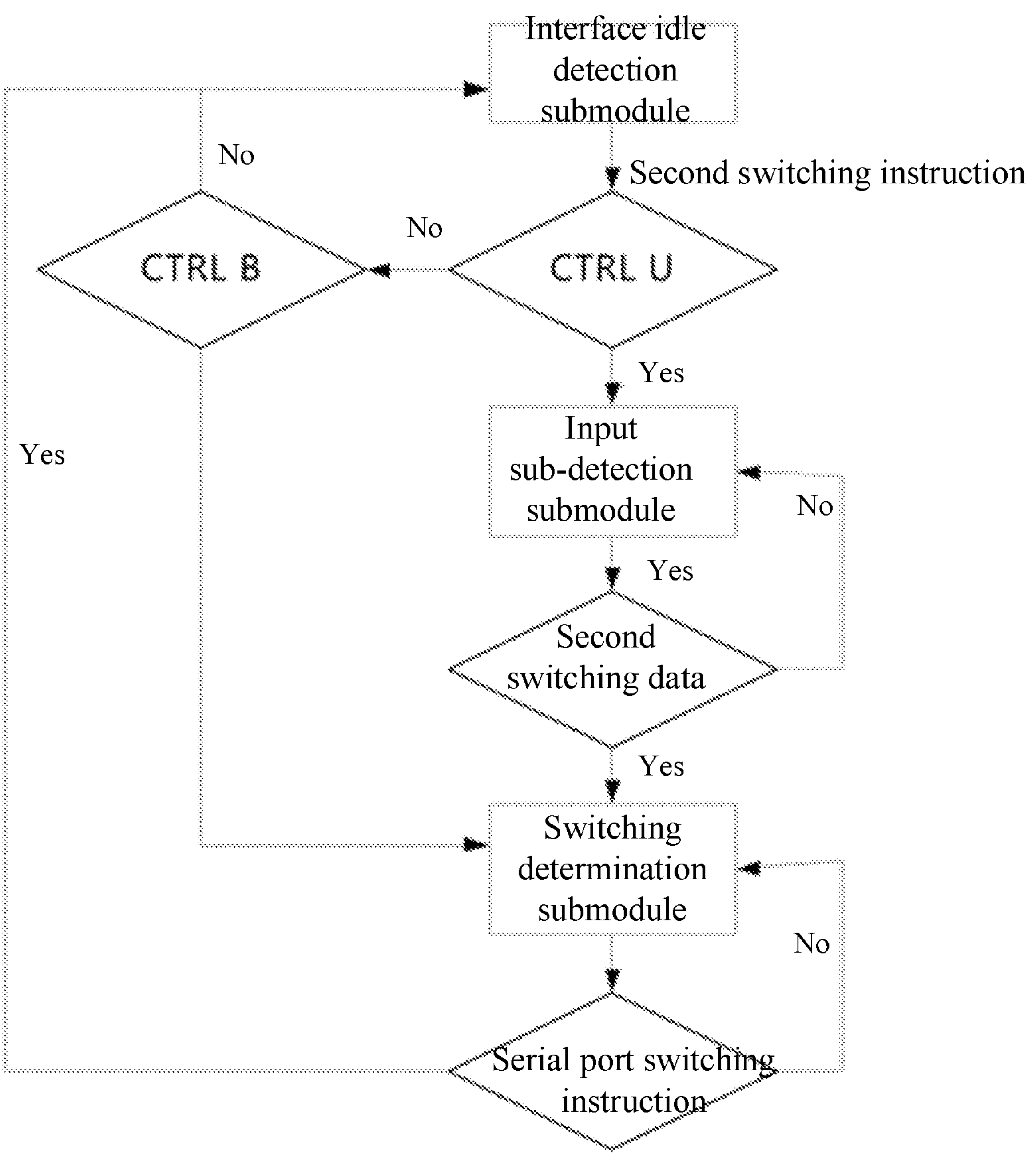
FIG. 4 is a schematic diagram illustrating processing of a serial port hub module in the programmable logic device system of the baseboard provided by some embodiments of this application.

Referring to FIG. 4, IDLE (interface idle detection submodule) is responsible for detecting the switching instruction input through the panel serial port. In response to the discovery of the switching instruction, if it is the keyboard input of CTRL U (second switching instruction), the state jumps to CHECK_ID (input sub-detection submodule); if it is the keyboard input of CTRL B (second switching instruction), the state jumps to CHECK_END (switching determination submodule). CHECK_ID is mainly configured to receive the keyboard input of 1 or 2 (the second switching data). After the reception is completed, the state jumps to CHECK_END. CHECK END is mainly configured to output a serial port switching instruction according to detection results of the aforementioned states. The serial port switching instruction is sent to the serial port switching module, which completes the specific switching.

In some embodiments of the application, the serial port switching module includes a serial port status judgment submodule.

The serial port status judgment submodule is configured to: obtain the status characteristic code of the serial port parsing module; connect the baseboard serial port module to the central processing unit or the baseboard management controller based on the status characteristic code.

In some embodiments of the application, the serial port status judgment submodule can obtain the status characteristic code of the serial port parsing module; determine the object to be switched based on the status characteristic code, and then connect the baseboard serial port module to the central processing unit or the baseboard management controller.

Specifically, the serial port status judgment submodule is configured to obtain the status characteristic code of the serial port parsing module. When the status characteristic code is the first target characteristic code, the baseboard serial port module is connected to the baseboard management controller. When the status characteristic code is the second target characteristic code, the baseboard serial port module is connected to the central processing unit.

In practical applications, the serial port status judgment submodule can determine whether the status characteristic code is the first target characteristic code or the second target characteristic code based on the status characteristic code of the serial port parsing module. The first target characteristic code indicates switching to the baseboard management controller. The second target characteristic code indicates switching to the central processing unit.

When the status characteristic code is the first target characteristic code, the baseboard serial port module is connected to the baseboard management controller. When the status characteristic code is the second target characteristic code, the baseboard serial port module is connected to the central processing unit.

In some embodiments, the serial port switching module further includes a first central processing unit transmission status detection submodule and a first baseboard management controller transmission status detection submodule.

The first central processing unit transmission status detection submodule is configured to detect whether the transmission direction from the central processing unit to the baseboard serial port module is idle when the status characteristic code is the first target characteristic code. When it is in an idle state, the connection channel from the central processing unit to the baseboard serial port module is disconnected.

The first baseboard management controller transmission status detection submodule is configured to detect whether the transmission direction from the baseboard management controller to the baseboard serial port module is idle. When it is in an idle state for a preset first waiting time, the channel between the baseboard serial port module and the baseboard management controller is established. Then, it returns to the serial port status judgment submodule.

In some embodiments, the serial port switching module further includes a second central processing unit transmission status detection submodule and a second baseboard management controller transmission status detection submodule.

The second central processing unit transmission status detection submodule is configured to detect the transmission direction from the baseboard management controller to the baseboard serial port module when the status characteristic code is the second target characteristic code. When it is in an idle state, the connection channel from the baseboard management controller to the baseboard serial port module is disconnected.

The second baseboard management controller transmission status detection submodule is configured to detect whether the transmission direction from the central processing unit to the baseboard serial port module is idle. When it is in an idle state for a preset second waiting time, the channel between the baseboard serial port module and the central processing unit is connected. Then, it returns to the serial port status judgment submodule.

Figure 5:
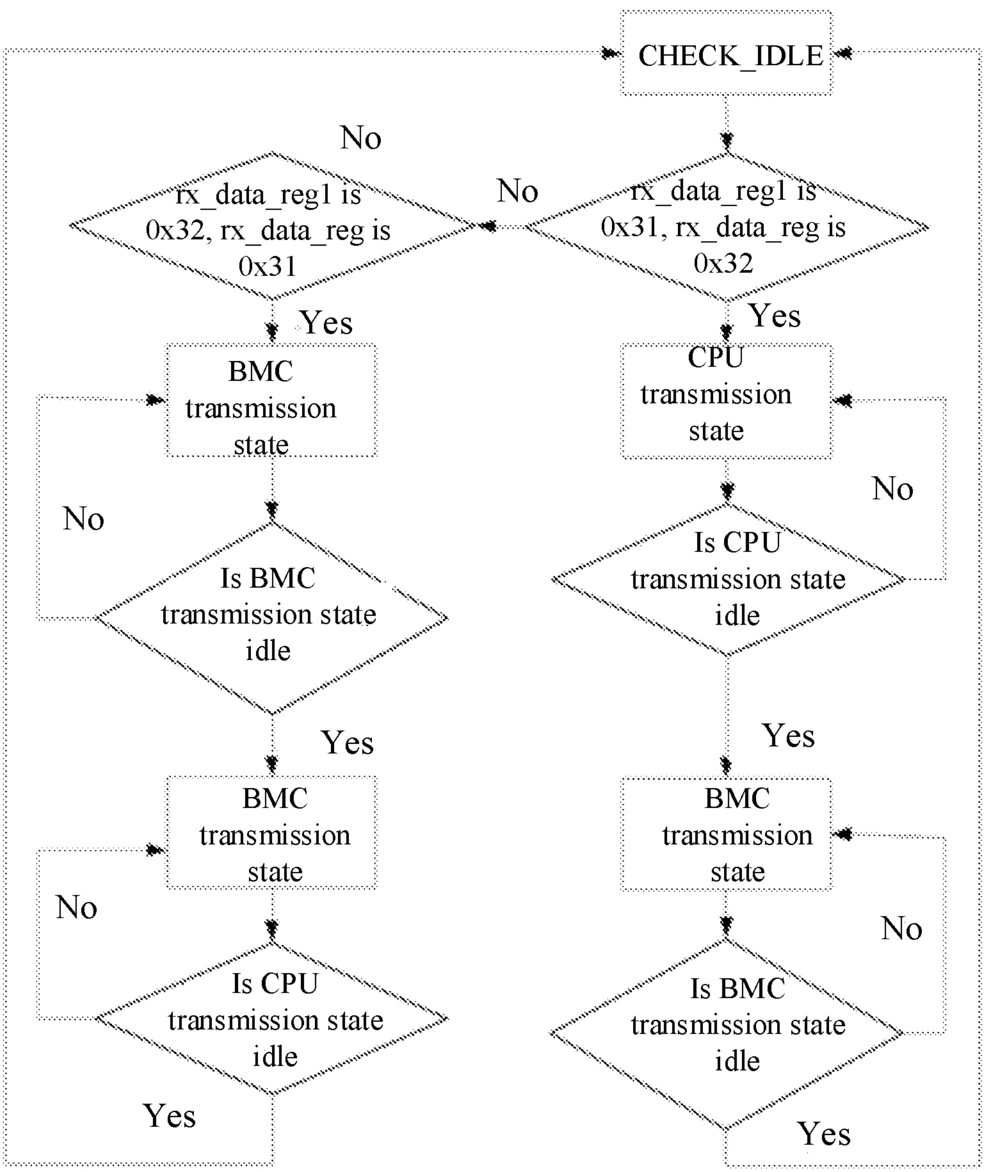
FIG. 5 is a schematic diagram illustrating processing of a serial port switching module in the programmable logic device system of the baseboard provided by some embodiments of this application.

Referring to FIG. 5, the CHECK_IDLE module (switching query module) is mainly configured to determine whether to switch the serial port to the BMC side or the CPU side. If rx_data_reg1 is 0x31 and rx_data_reg is 0x32, then the serial port needs to be switched to the BMC side (baseboard management controller). If rx_data_reg1 is 0x32 and rx_data_reg is 0x31, then the serial port needs to be switched to the CPU side. The CPU2BMC_1 state (central processing unit transmission state) is mainly used for detecting whether the current transmission direction from the CPU to the panel serial port is idle. If it is idle, the current connection is disconnected; otherwise, the current connection is maintained. The CPU2BMC_2 state (baseboard management controller transmission state) is mainly used for detecting whether the BMC transmission direction is idle for more than 4 milliseconds. If the conditions are met, the BMC's serial port is connected to the panel serial port; otherwise, the connection remains disconnected. After the state switching is completed, the state jumps to the CHECK_IDLE state to wait for the next switch. The BMC2CPU_1 state (baseboard management controller transmission state) is mainly used for detecting whether the transmission direction from the BMC to the panel port is idle. If it is idle, the current connection is disconnected; otherwise, the current connection is maintained. The BMC2CPU_2 state (central processing unit transmission state) is mainly used for detecting whether the CPU transmission direction is idle for more than 4 milliseconds. If the conditions are met, the CPU's serial port is connected to the panel serial port; otherwise, the connection remains disconnected. After the state switching is completed, the state jumps to the CHECK_IDLE state to wait for the next switch.

In some embodiments of the application, the serial port parsing module includes:

a start bit check submodule configured to detect whether a serial port start bit is present;

an initiation submodule configured to receive start bit data of the serial port data in response to presence of the serial port start bit;

a payload submodule configured to receive serial port byte data of the serial port data after the start bit data is received; and a stop submodule configured to receive stop bit data of the serial port data when the received serial port byte data reaches a preset number of bits.

In some embodiments of the application, the serial port parsing module includes a start bit check submodule, an initiation submodule, a payload submodule, and a stop submodule. The start bit check submodule is utilized to detect the presence of the serial port start bit. When the start bit exists, the start submodule receives the start bit data of the serial port data in sequence. Then, the payload submodule receives the serial port byte data of the serial port data. Finally, the stop submodule receives the stop bit data of the serial port data when the received serial port byte data reaches a preset number of bits, thereby completing the reception of one byte.

Figure 6:
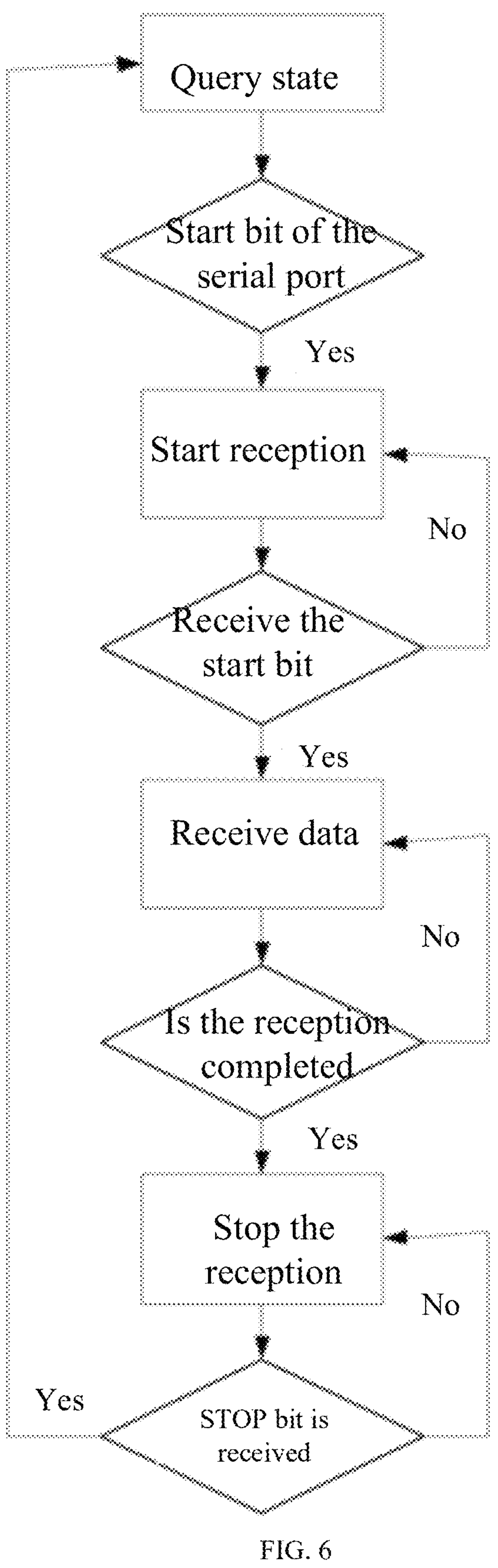
FIG. 6 is a schematic diagram illustrating a state machine of a serial port parsing module in the programmable logic device system of the baseboard provided by some embodiments of this application.

Referring to FIG. 6, the IDLE state (query state) mainly implements the check of the start bit of the serial port data. After the discovery of the start bit of the serial port, the state machine jumps to the START state (start state). The START state mainly implements the reception of the start bit data. After the reception is completed, the state jumps to the PAYLOAD state (Completion State). The PAYLOAD state mainly implements the reception of 8 bytes of data. After the reception is completed, the state jumps to the STOP state (stop state). The STOP state mainly implements the reception of the STOP bit of the serial port. After the reception is completed, the state jumps back to the IDLE state to complete the reception of 1 byte of data. The above process loops repeatedly to realize continuous data reception.

In some embodiments of the application, the problems of garbled characters and system hanging caused by serial port switching are solved by only detecting the idle state of the bus and switching delays, without caching serial port data. Practical verification shows that this method can effectively solve the above problems. This solution does not affect the existing hardware design and is imperceptible to upper-layer software. It reduces the complexity of system hardware design, facilitates unified software processing, reduces software processing complexity, thereby lowering development difficulty and risk and reducing operational costs.

Figure 7:
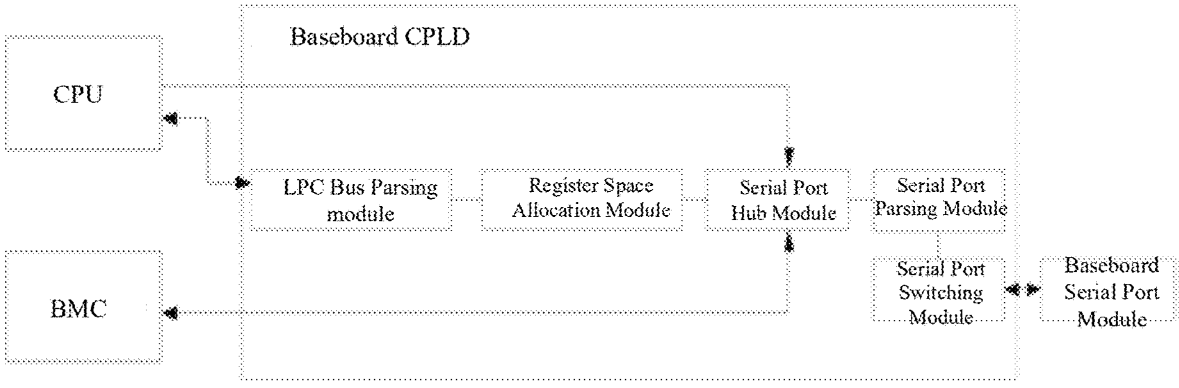
FIG. 7 is a schematic diagram of a baseboard serial port system provided by some embodiments of this application.

FIG. 7 is a schematic diagram of a baseboard serial port system provided by an embodiment of the application. The baseboard serial port system may include: a central processing unit, a baseboard management controller, a baseboard serial port module, and the programmable logic device system of the baseboard as described above. One end of the programmable logic device system of the baseboard is connected to the central processing unit and the baseboard management controller, and the other end of the programmable logic device system of the baseboard is connected to the baseboard serial port module.

In some embodiments of the application, the interfaces of the central processing unit, the baseboard management controller, and the baseboard serial port module are all connected to the programmable logic device system of the baseboard. One end of the programmable logic device system of the baseboard is connected to the central processing unit and the baseboard management controller, and the other end of the programmable logic device system of the baseboard is connected to the baseboard serial port module. The CPLD implements the serial port complete byte switching according to the panel port switching instruction, thereby connecting the central processing unit with the baseboard serial port module, or connecting the baseboard management controller with the baseboard serial port module.

In some embodiments, the baseboard serial port module includes a panel physical interface that is connected to the other end of the programmable logic device system of the baseboard.

In some embodiments of the application, the baseboard serial port module may include a panel physical interface, for example a panel RJ45. The panel physical interface is connected to the other end of the programmable logic device system of the baseboard, that is, it is connected to the CPLD on the side different from the central processing unit and the baseboard management controller.

In some embodiments, the baseboard serial port module further includes:

a level conversion submodule that is located between the level conversion submodule and the other end of the programmable logic device system of the baseboard, and configured to convert level of the serial port.

In some embodiments of the application, a level conversion submodule may be provided between the level conversion submodule and the other end of the programmable logic device system of the baseboard, as shown in FIG. 1, the level conversion submodule may be MAX232. The level conversion submodule is configured to perform level conversion for the serial port.

In some embodiments, the central processing unit includes:

a first universal asynchronous receiver-transmitter of the central processing unit, connected to one end of the programmable logic device system of the baseboard, for communicating with the baseboard serial port module based on the baseboard serial port system; and a second universal asynchronous receiver-transmitter of the central processing unit, connected to one end of the programmable logic device system of the baseboard, for generating start logs and operation logs of the central processing unit.

In some embodiments of the application, the central processing unit may include two different universal asynchronous receiver-transmitters, namely the first universal asynchronous receiver-transmitter of the central processing unit and the second universal asynchronous receiver-transmitter of the central processing unit. The first universal asynchronous receiver-transmitter of the central processing unit communicates with the baseboard serial port module based on the baseboard serial port system, that is, it is configured to communicate with the panel serial port. The second universal asynchronous receiver-transmitter of the central processing unit is configured to record the start logs and system operation logs of the central processing unit.

In some embodiments, the baseboard management controller includes:

a first universal asynchronous receiver-transmitter of the baseboard management controller, connected to one end of the programmable logic device system of the baseboard, for communicating with the baseboard serial port module based on the baseboard serial port system; and a second universal asynchronous receiver-transmitter of the baseboard management controller, connected to one end of the programmable logic device system of the baseboard, for generating the start logs and operation logs of the baseboard management controller.

In some embodiments of the application, the baseboard management controller may include two different universal asynchronous receiver-transmitters, namely the first universal asynchronous receiver-transmitter of the baseboard management controller and the second universal asynchronous receiver-transmitter of the baseboard management controller. The first universal asynchronous receiver-transmitter of the baseboard management controller communicates with the baseboard serial port module based on the baseboard serial port system, that is, it is configured to communicate with the panel serial port. The second universal asynchronous receiver-transmitter of the baseboard management controller is configured to record the start logs and system operation logs of the baseboard management controller.

In some embodiments, the programmable logic device system of the baseboard includes:

- a low pin count bus parsing module that is connected to the central processing unit, and configured to parse low pin count bus commands issued by the central processing unit;
- a register space allocation module that is connected to the low pin count bus parsing module, and configured to allocate data from the low pin count bus commands to a preset register address space;
- a serial port hub module that is connected to the central processing unit and the baseboard management controller, and configured to interact with the central processing unit and the baseboard management controller and provide the preset register address space;
- a serial port parsing module that is connected to the serial port hub module, and configured to parse serial port data between the baseboard serial port module and the central processing unit, or serial port data between the baseboard serial port module and the baseboard management controller; and
- a serial port switching module that is connected to the serial port parsing module, and is configured to connect the baseboard serial port module with the central processing unit or the baseboard management controller based on a serial port complete byte switching strategy.

In some embodiments, the programmable logic device system of the baseboard further includes:

- a filtering module that is located between the serial port parsing module and the baseboard serial port module, and configured to filter out interference signals from the baseboard serial port module.

In some embodiments, the programmable logic device system of the baseboard further includes:

- a baud rate detection module that is connected to the baseboard serial port module, and configured to detect the baud rate of the baseboard serial port module, and the baud rate is used for controlling the data transmission rate.

In some embodiments, the serial port hub module includes:

- an interface idle detection submodule configured to detect the switching instruction of the baseboard serial port module;
- a switching determination submodule configured to, when the switching instruction is a first input instruction, generate a first target characteristic code or a second target characteristic code based on the first switching data of the first input instruction.

In some embodiments, the serial port hub module further includes an input sub-detection submodule that is configured to, when the switching instruction is a second switching instruction, parse the second switching instruction and determine the second switching data.

The switching determination submodule is further configured to generate the first target characteristic code or the second target characteristic code based on the second switching data.

In some embodiments, the serial port switching module includes:

- a serial port status judgment submodule configured to: obtain the status characteristic code of the serial port parsing module; connect the baseboard serial port module with the central processing unit or the baseboard management controller based on the status characteristic code.

In some embodiments, the serial port status judgment submodule is configured to obtain the status characteristic code of the serial port parsing module. When the status characteristic code is the first target characteristic code, the baseboard serial port module is connected to the baseboard management controller. When the status characteristic code is the second target characteristic code, the baseboard serial port module is connected to the central processing unit.

In some embodiments, the serial port switching module further includes a first central processing unit transmission status detection submodule and a first baseboard management controller transmission status detection submodule.

The first central processing unit transmission status detection submodule is configured to detect whether the transmission direction from the central processing unit to the baseboard serial port module is idle when the status characteristic code is the first target characteristic code. When it is in an idle state, the connection channel from the central processing unit to the baseboard serial port module is disconnected.

The first baseboard management controller transmission status detection submodule is configured to detect whether the transmission direction from the baseboard management controller to the baseboard serial port module is idle. When it is in an idle state for a preset first waiting time, the channel between the baseboard serial port module and the baseboard management controller is established. Then, it returns to the serial port status judgment submodule.

In some embodiments, the serial port switching module further includes a second central processing unit transmission status detection submodule and a second baseboard management controller transmission status detection submodule.

The second central processing unit transmission status detection submodule is configured to detect the transmission direction from the baseboard management controller to the baseboard serial port module when the status characteristic code is the second target characteristic code. When it is in an idle state, the connection channel from the baseboard management controller to the baseboard serial port module is disconnected.

The second baseboard management controller transmission status detection submodule is configured to detect whether the transmission direction from the central processing unit to the baseboard serial port module is idle. When it is in an idle state for a preset second waiting time, the channel between the baseboard serial port module and the central processing unit is connected. Then, it returns to the serial port status judgment submodule.

In some embodiments, the serial port parsing module includes:

- a start bit check submodule configured to detect whether a serial port start bit is present;
- an initiation submodule configured to receive the start bit data of the serial port data in response to presence of the serial port start bit;
- a payload submodule configured to receive serial port byte data of the serial port data after the start bit data is received; and a stop submodule configured to receive stop bit data of the serial port data when the received serial port byte data reaches a preset number of bits.

In some embodiments, the filtering module is configured to determine the initial input value of the serial port input data as the input value of the serial port input data when a preset number of consecutive bits in the serial port input data of the baseboard serial port module are the same initial input value.

In some embodiments, the baud rate detection module is configured to count the change number of level on the signal line within a third preset time duration and determine the baud rate based on the count.

Some embodiments of the application further provide a switch equipped with the baseboard serial port system described above. The management plane and network forwarding plane information interaction control is carried out through the baseboard serial port system.

The baseboard serial port system includes: a central processing unit, a baseboard management controller, a baseboard serial port module, and the programmable logic device system of a baseboard as described above. One end of the programmable logic device system of the baseboard is connected to the central processing unit and the baseboard management controller, and the other end of the programmable logic device system of the baseboard is connected to the baseboard serial port module.

In some embodiments, the baseboard serial port module includes a panel physical interface that is connected to the other end of the programmable logic device system of the baseboard.

In some embodiments, the baseboard serial port module further includes a level conversion submodule that is located between the level conversion submodule and the other end of the programmable logic device system of the baseboard, and configured to convert level of the serial port.

In some embodiments, the central processing unit includes:

a first universal asynchronous receiver-transmitter of the central processing unit, connected to one end of the programmable logic device system of the baseboard, for communicating with the baseboard serial port module based on the baseboard serial port system; and a second universal asynchronous receiver-transmitter of the central processing unit, connected to one end of the programmable logic device system of the baseboard, for generating the start logs and operation logs of the central processing unit.

In some embodiments, the baseboard management controller includes:

a first universal asynchronous receiver-transmitter of the baseboard management controller, connected to one end of the programmable logic device system of the baseboard, for communicating with the baseboard serial port module based on the baseboard serial port system; and a second universal asynchronous receiver-transmitter of the baseboard management controller, connected to one end of the programmable logic device system of the baseboard, for generating the start logs and operation logs of the baseboard management controller.

Specifically, one end of the programmable logic device system of the baseboard is connected to the central processing unit and the baseboard management controller, and the other end of the programmable logic device system of the baseboard is connected to the baseboard serial port module. The programmable logic device system of the baseboard includes:

a low pin count bus parsing module that is connected to the central processing unit, and configured to parse low pin count bus commands issued by the central processing unit;

a register space allocation module that is connected to the low pin count bus parsing module, and configured to allocate data from the low pin count bus commands to a preset register address space;

a serial port hub module that is connected to the central processing unit and the baseboard management controller, and configured to interact with the central processing unit and the baseboard management controller and provide the preset register address space;

a serial port parsing module that is connected to the serial port hub module, and configured to parse serial port data between the baseboard serial port module and the central processing unit, or serial port data between the baseboard serial port module and the baseboard management controller; and a serial port switching module that is connected to the serial port parsing module, and is configured to switch the baseboard serial port module to connect with the central processing unit or the baseboard management controller based on a serial port complete byte switching strategy.

In some embodiments, the programmable logic device system of the baseboard further includes:

a filtering module that is located between the serial port parsing module and the baseboard serial port module, and configured to filter out interference signals from the baseboard serial port module.

In some embodiments, the programmable logic device system of the baseboard further includes:

a baud rate detection module that is connected to the baseboard serial port module, and configured to detect the baud rate of the baseboard serial port module, and the baud rate is used for controlling the data transmission rate.

In some embodiments, the serial port hub module includes:

an interface idle detection submodule configured to detect the switching instruction of the baseboard serial port module;

a switching determination submodule configured to, when the switching instruction is a first input instruction, generate a first target characteristic code or a second target characteristic code based on the first switching data of the first input instruction.

In some embodiments, the serial port hub module further includes an input sub-detection submodule that is configured to, when the switching instruction is a second switching instruction, parse the second switching instruction and determine the second switching data.

The switching determination submodule is further configured to generate the first target characteristic code or the second target characteristic code based on the second switching data.

In some embodiments, the serial port switching module includes a serial port status judgment submodule that is configured to obtain the status characteristic code of the serial port parsing module; connect the baseboard serial port module to the central processing unit or the baseboard management controller based on the status characteristic code.

In some embodiments, the serial port status judgment submodule is configured to obtain the status characteristic code of the serial port parsing module. When the status characteristic code is the first target characteristic code, the baseboard serial port module is connected to the baseboard management controller. When the status characteristic code is the second target characteristic code, the baseboard serial port module is connected to the central processing unit.

In some embodiments, the serial port switching module further includes a first central processing unit transmission status detection submodule and a first baseboard management controller transmission status detection submodule.

The first central processing unit transmission status detection submodule is configured to detect whether the transmission direction from the central processing unit to the baseboard serial port module is idle when the status characteristic code is the first target characteristic code. When it is in an idle state, the connection channel from the central processing unit to the baseboard serial port module is disconnected.

The first baseboard management controller transmission status detection submodule is configured to detect whether the transmission direction from the baseboard management controller to the baseboard serial port module is idle. When it is in an idle state for a preset first waiting time, the channel between the baseboard serial port module and the baseboard management controller is established. Then, it returns to the serial port status judgment submodule.

In some embodiments, the serial port switching module further includes a second central processing unit transmission status detection submodule and a second baseboard management controller transmission status detection submodule.

The second central processing unit transmission status detection submodule is configured to detect the transmission direction from the baseboard management controller to the baseboard serial port module when the status characteristic code is the second target characteristic code. When it is in an idle state, the connection channel from the baseboard management controller to the baseboard serial port module is closed.

The second baseboard management controller transmission status detection submodule is configured to detect whether the transmission direction from the central processing unit to the baseboard serial port module is idle. When it is in an idle state for a preset second waiting time, the channel between the baseboard serial port module and the central processing unit is connected. Then, it returns to the serial port status judgment submodule.

In some embodiments, the serial port parsing module includes:

a start bit check submodule configured to detect whether a serial port start bit is present;

an initiation submodule configured to receive the start bit data of the serial port data in response to presence of the serial port start bit;

a payload submodule configured to receive serial port byte data of the serial port data after the start bit data is received; and a stop submodule configured to receive stop bit data of the serial port data when the received serial port byte data reaches a preset number of bits.

In some embodiments, the filtering module is configured to determine the initial input value of the serial port input data as the input value of the serial port input data when a preset number of consecutive bits in the serial port input data of the baseboard serial port module are the same initial input value.

In some embodiments, the baud rate detection module is configured to count the change number of level on the signal line within a third preset time duration and determine the baud rate based on the count.

Figure 8:
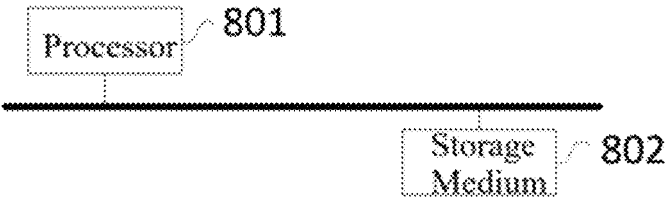
FIG. 8 is a structural block diagram of an electronic device provided by some embodiments of this application.

Referring to FIG. 8, some embodiments of the application further provide an electronic device including a processor 801 and a storage medium 802. The storage medium 802 is stored with computer programs executable by the processor 801. When the electronic device is running, the processor 801 executes the computer programs to implement the programmable logic device system of a baseboard as described in any of the embodiments of the application.

The storage medium may include random access memory (RAM) and may also include non-volatile memory, such as at least one disk storage. In some embodiments, the memory may also be at least one storage device located away from the aforementioned processor.

The aforementioned processor may be a general-purpose processor, including a central processing unit (CPU), a network processor (NP), etc. Alternatively, the processor may also be a digital signal processor (DSP), an application-specific integrated circuit (ASIC), a field-programmable gate array (FPGA), or other programmable logic devices, discrete gate or transistor logic devices, discrete hardware components.

Figure 9:
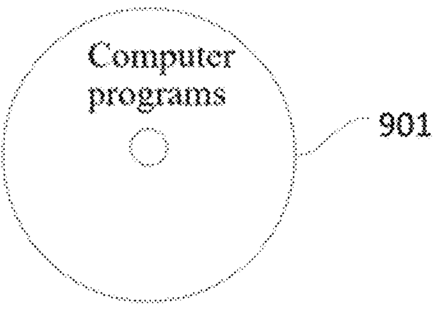
FIG. 9 is a structural block diagram of a storage medium provided by some embodiments of this application.

Referring to FIG. 9, some embodiments of the application further provide a non-volatile computer-readable storage medium 901. The storage medium 901 is stored with computer programs that, when executed by a processor, implement the programmable logic device system of a baseboard as described in any of the embodiments of this application.

It should be noted that in order to simplify the description, the aforementioned embodiments are all described as a series of actions. However, those skilled in the art should know that the embodiments of this application are not limited to the described order of actions. According to the embodiments of this application, some steps can be performed in other orders or simultaneously. Secondly, those skilled in the art should also know that the embodiments described in the specification all belong to the embodiments of this application, and the actions involved are not necessarily essential for the embodiments of this application.

The embodiments in this specification are described in a progressive manner. Each embodiment focuses on the differences from other embodiments. The same or similar parts of the various embodiments can be referred to each other.

Those skilled in the art should understand that the embodiments of this application can be provided as methods, devices, or computer program products. Therefore, the embodiments of this application can take the form of complete hardware embodiments, complete software embodiments, or embodiments combining software and hardware. Moreover, the embodiments of this application can take the form of computer program products implemented on one or more computer-readable storage media (including but not limited to magnetic disk storage, CD-ROM, optical storage, etc.) containing computer program code.

The embodiments of this application are described with reference to the flowcharts and/or block diagrams of methods, terminal devices (systems), and computer program products according to some embodiments of this application. It should be understood that each block in the flowchart and/or block diagram and the combination of blocks in the flowchart and/or block diagram can be implemented by computer program instructions. These computer program instructions can be provided to the processor of a general-purpose computer, a special-purpose computer, an embedded processor, or other programmable data processing terminal devices to produce a machine. Thus, the instructions executed by the processor of a computer or other programmable data processing terminal devices generate means for implementing the functions specified in one block or multiple blocks of the flowchart and/or block diagram.

These computer program instructions can also be stored in a computer-readable memory that can guide a computer or other programmable data processing terminal devices to work in a specific manner. Thus, the instructions stored in the computer-readable memory produce an article of manufacture including instruction means that implement the functions specified in one block or multiple blocks of the flowchart and/or block diagram.

These computer program instructions can also be loaded onto a computer or other programmable data processing terminal devices. Thus, a series of operational steps are executed on the computer or other programmable terminal devices to produce computer-implemented processing. Therefore, the steps executed by the computer or other programmable terminal devices provide steps for implementing the functions specified in one block or multiple blocks of the flowchart and/or block diagram.

Although some embodiments of this application have been described, those skilled in the art, once aware of the basic inventive concept, can make additional changes and modifications to these embodiments. Therefore, the appended claims are intended to include the embodiments of this application and all changes and modifications falling within the scope of this application.

Finally, it should also be noted that relational terms such as first and second are used merely to distinguish one entity or operation from another, and do not necessarily require or imply any such actual relationship or order between these entities or operations. Moreover, the terms "include," "comprise," or any other variants are intended to cover non-exclusive inclusion. Thus, a process, method, item, or terminal device that includes a series of elements not only includes those elements but also includes other elements not explicitly listed, or elements inherent to such process, method, item, or terminal device. In the absence of more limitations, an element defined by the phrase "including a . . . " does not exclude the presence of additional identical elements in the process, method, item, or terminal device that includes the element.

The programmable logic device system of a baseboard, the baseboard serial port system, the switch, the electronic device, and the storage medium provided by this application have been introduced in detail above. The principles and implementation methods of this application have been described in this article through specific examples. The descriptions of the above embodiments are only used to help understand the methods and core ideas of this application. For those skilled in the art, based on the ideas of this application, there will be changes in the specific implementation methods and application scopes. In summary, the content of this specification should not be understood as a limitation on this application.

The invention claimed is:

1. A programmable logic device system of a baseboard, one end of the programmable logic device system of the baseboard being connected to a central processing unit and a baseboard management controller, the other end of the programmable logic device system of the baseboard being connected to a baseboard serial port module, wherein the programmable logic device system of the baseboard comprises:

- a low pin count bus parsing module, connected to the central processing unit and configured to parse low pin count bus commands issued by the central processing unit;
- a register space allocation module, connected to the low pin count bus parsing module and configured to allocate data from the low pin count bus commands to a preset register address space;
- a serial port hub module, connected to the central processing unit and the baseboard management controller, and configured to interact with the central processing unit and the baseboard management controller, and provide the preset register address space;
- a serial port parsing module, connected to the serial port hub module, and configured to parse serial port data between the baseboard serial port module and the central processing unit, or serial port data between the baseboard serial port module and the baseboard management controller; and
- a serial port switching module, connected to the serial port parsing module, and configured to connect the baseboard serial port module with the central processing unit or the baseboard management controller by performing serial port complete byte switching based on a serial port complete byte switching strategy.

2. The programmable logic device system of the baseboard according to claim 1, further comprising:

- a filtering module located between the serial port parsing module and the baseboard serial port module and configured to filter out interference signals from the baseboard serial port module.

3. The programmable logic device system of the baseboard according to claim 1, further comprising:

- a baud rate detection module connected to the baseboard serial port module and configured to detect baud rate of the baseboard serial port module, the baud rate being used for controlling data transmission rate.

4. The programmable logic device system of the baseboard according to claim 1, wherein the serial port hub module comprises:

- an interface idle detection submodule configured to detect switching instruction of the baseboard serial port module; and
- a switching determination submodule configured to, in response to the switching instruction being a first input instruction, generate a first target characteristic code or a second target characteristic code based on first switching data of the first input instruction.

5. The programmable logic device system of the baseboard according to claim 4, wherein the serial port hub module further comprises:

- an input sub-detection submodule configured to, in response to the switching instruction being a second switching instruction, parse the second switching instruction and determine second switching data;
- wherein the switching determination submodule is further configured to generate the first target characteristic code or the second target characteristic code based on the second switching data.

6. The programmable logic device system of the baseboard according to claim 5, wherein the serial port switching module comprises:

- a serial port status judgment submodule, configured to: obtain status characteristic code of the serial port parsing module; connect the baseboard serial port module with the central processing unit or the baseboard management controller based on the status characteristic code.

7. The programmable logic device system of the baseboard according to claim 6, wherein the serial port status judgment submodule is configured to: obtain the status characteristic code of the serial port parsing module; in response to the status characteristic code being the first target characteristic code, connect the baseboard serial port module with the baseboard management controller; in response to the status characteristic code being the second target characteristic code, connect the baseboard serial port module with the central processing unit.

8. The programmable logic device system of the baseboard according to claim 7, wherein the serial port switching module further comprises:

a first central processing unit transmission status detection submodule configured to: detect whether a transmission direction from the central processing unit to the baseboard serial port module is idle in response to the status characteristic code being the first target characteristic code; disconnect a connection channel from the central processing unit to the baseboard serial port module in response to an idle state; and a first baseboard management controller transmission status detection submodule configured to: detect whether the transmission direction from the baseboard management controller to the baseboard serial port module is idle; in response to being in an idle state for a preset first waiting time, establish a channel connection between the baseboard serial port module and the baseboard management controller; return to the serial port status judgment submodule after the channel connection is established.

9. The programmable logic device system of the baseboard according to claim 7, wherein the serial port switching module further comprises:

a second central processing unit transmission status detection submodule configured to: detect a transmission direction from the baseboard management controller to the baseboard serial port module in response to the status characteristic code being the second target characteristic code; in response to being in an idle state, disconnect a connection channel from the baseboard management controller to the baseboard serial port module;

a second baseboard management controller transmission status detection submodule configured to: detect whether the transmission direction from the central processing unit to the baseboard serial port module is idle; in response to being in an idle state for a preset second waiting time, establish a channel connection between the baseboard serial port module and the central processing unit; return to the serial port status judgment submodule after the channel connection is established.

10. The programmable logic device system of the baseboard according to claim 1, wherein the serial port parsing module comprises:

a start bit check submodule configured to detect whether a serial port start bit is present;

an initiation submodule configured to receive start bit data of the serial port data in response to presence of the serial port start bit;

a payload submodule configured to receive serial port byte data of the serial port data after the start bit data is received; and a stop submodule configured to receive stop bit data of the serial port data in response to determining that the received serial port byte data reaches a preset number of bits.

11. The programmable logic device system of the baseboard according to claim 2, wherein the filtering module is configured to determine initial input value of the serial port input data as input value of the serial port input data in response to determining that a preset number of consecutive bits in the serial port input data of the baseboard serial port module are the same initial input value.

12. The programmable logic device system of the baseboard according to claim 3, wherein the baud rate detection module is configured to count a change number of level on signal lines within a third preset time duration, and determine the baud rate based on the number counted.

13. A baseboard serial port system, comprising: a central processing unit, a baseboard management controller, a baseboard serial port module, and the programmable logic device system of the baseboard according to claim 1, wherein one end of the programmable logic device system of the baseboard is connected to the central processing unit and the baseboard management controller, and the other end of the programmable logic device system of the baseboard is connected to the baseboard serial port module.

14. The baseboard serial port system according to claim 13, wherein the baseboard serial port module comprises a panel physical interface connected to the other end of the programmable logic device system of the baseboard.

15. The baseboard serial port system according to claim 14, further comprising:

a level conversion submodule located between the level conversion submodule and the other end of the programmable logic device system of the baseboard, wherein the level conversion submodule is configured to convert level of the serial port.

16. The baseboard serial port system according to claim 13, wherein the central processing unit comprises:

a first universal asynchronous receiver-transmitter of the central processing unit that is connected to one end of the programmable logic device system of the baseboard, and configured to communicate with the baseboard serial port module based on the baseboard serial port system; and a second universal asynchronous receiver-transmitter of the central processing unit that is connected to one end of the programmable logic device system of the baseboard, and configured to generate start logs and operation logs of the central processing unit.

17. The baseboard serial port system according to claim 13, wherein the baseboard management controller comprises:

a first universal asynchronous receiver-transmitter of the baseboard management controller that is connected to one end of the programmable logic device system of the baseboard, and configured to communicate with the baseboard serial port module based on the baseboard serial port system; and a second universal asynchronous receiver-transmitter of the baseboard management controller that is connected to one end of the programmable logic device system of a baseboard, and configured to generate start logs and operation logs of the baseboard management controller.

18. A switch comprising the baseboard serial port system according to claim 13.

19. An electronic device, comprising: a processor, a memory, and a computer program stored on the memory to be run on the processor, wherein the computer program, when executed by the processor, implements the programmable logic device system of the baseboard according to claim 1.

20. A non transitory computer-readable storage medium, wherein the non-transitory computer-readable storage medium is stored with a computer program that, when executed by a processor, implements the programmable logic device system of the baseboard according to claim 1.

* * * * *